(12) United States Patent
Van Der Helm

(10) Patent No.: US 8,905,701 B2
(45) Date of Patent: Dec. 9, 2014

(54) LIFT HAND TRUCK

(76) Inventor: Hermanus Cornelis Van Der Helm, The Hague (NL)

( * ) Notice: Subject to any disclaimer, the term of this patent is extended or adjusted under 35 U.S.C. 154(b) by 656 days.

(21) Appl. No.: 13/264,698

(22) PCT Filed: Apr. 15, 2010

(86) PCT No.: PCT/NL2010/050196
§ 371 (c)(1),
(2), (4) Date: Oct. 14, 2011

(87) PCT Pub. No.: WO2010/120176
PCT Pub. Date: Oct. 21, 2010

(65) Prior Publication Data
US 2012/0031706 A1    Feb. 9, 2012

(30) Foreign Application Priority Data
Apr. 15, 2009    (NL) ..................... 2002749

(51) Int. Cl.
| | |
|---|---|
| *B62B 1/12* | (2006.01) |
| *B66F 9/06* | (2006.01) |
| *B62B 1/10* | (2006.01) |
| B62B 5/00 | (2006.01) |
| B62B 5/04 | (2006.01) |

(52) U.S. Cl.
CPC ............... *B66F 9/06* (2013.01); *B62B 5/0066* (2013.01); *B62B 5/0485* (2013.01); *B62B 5/0026* (2013.01); *B62B 2203/10* (2013.01); *B62B 5/04* (2013.01); *B62B 1/10* (2013.01)
USPC .......................... 414/490; 187/253

(58) Field of Classification Search
CPC ............... B62B 2203/10; B62B 1/12
USPC .................. 414/444, 490; 298/2; 187/253
See application file for complete search history.

(56) References Cited

U.S. PATENT DOCUMENTS

| | | | | |
|---|---|---|---|---|
| 2,838,193 A | * | 6/1958 | Statton | 414/490 |
| 3,951,286 A | * | 4/1976 | Horst | 414/444 |

(Continued)

FOREIGN PATENT DOCUMENTS

| | | |
|---|---|---|
| ES | 2188308 | 6/2003 |
| GB | 2 362 372 | 11/2001 |

(Continued)

OTHER PUBLICATIONS

Search Report in International Application PCT/NL2010/050196 mailed Jul. 6, 2010.

*Primary Examiner* — Jonathan Snelting
(74) *Attorney, Agent, or Firm* — Gilberto M. Villacorta; Sunit Talapatra; Foley & Lardner LLP

(57) ABSTRACT

Hand truck with a frame provided with a substantially vertical guide, two wheels which are situated near the bottom side of the guide and which are rotatable about a transverse shaft, a handle which is situated near the upper side of the guide, a lifting device comprising a lifting element which is displaceable along the guide and a lifting drive which is connected to the lifting element for displacing the lifting element, a motor for driving the wheels and a brake cooperating with the wheels for blocking the rotation of the wheels, in which a control device is provided which can be operated via the handle for switching the lifting drive and the motor on and off, characterized in that, in a lower driving position of the lifting element, the brake is released and, when the lifting element is moved from the lower driving position to a lifting position, the brake is engaged, in which case the wheels can be driven via the motor at a positioning speed.

11 Claims, 5 Drawing Sheets

(56) References Cited

U.S. PATENT DOCUMENTS

| | | | | |
|---|---|---|---|---|
| 5,251,922 A | * | 10/1993 | Mann | 280/47.29 |
| 5,975,826 A | * | 11/1999 | Scholder | 414/444 |
| 6,309,168 B1 | * | 10/2001 | Holmes | 414/490 |
| 6,530,740 B2 | * | 3/2003 | Kim | 414/490 |
| 6,929,443 B1 | * | 8/2005 | Nellis | 414/449 |
| 7,712,582 B2 | * | 5/2010 | Burton et al. | 187/238 |
| 2005/0155799 A1 | | 7/2005 | Chambers | |
| 2007/0007051 A1 | | 1/2007 | Chambers | |
| 2007/0295562 A1 | * | 12/2007 | Burton et al. | 187/233 |

FOREIGN PATENT DOCUMENTS

| | | |
|---|---|---|
| JP | 2002-087269 A | 3/2002 |
| WO | WO-2005/068273 A1 | 7/2005 |

* cited by examiner

LIFT HAND TRUCK

FIELD OF THE INVENTION

The invention relates to a hand truck with a frame provided with a substantially vertical guide, two wheels which are situated near the bottom side of the guide and which are rotatable about a transverse shaft, a handle which is situated near the upper side of the guide, a lifting device comprising a lifting element which is displaceable along the guide and a lifting drive which is connected to the lifting element for displacing the lifting element, a motor for driving the wheels and a brake cooperating with the wheels for blocking the rotation of the wheels, in which a control device is provided which can be operated via the handle for switching the lifting drive and the motor on and off.

BACKGROUND OF THE INVENTION

A hand truck of this type is known from ES 2 188 308. In this publication, a hand truck is described which has a driven lifting platform and is driven by an electric motor. The electric motor acts as a brake when the known hand truck goes down a slope. During lifting, the hand truck rests on the floor by means of a rectangular frame in a stationary manner, in such a way that the vertical guide is at right angles to said floor.

The known hand truck has the drawback that the frame of the hand truck has to be brought to the vertical position during lifting. Maneuvering a lifted load is thus not possible with the known truck.

US 2001/007051 describes a hand truck which is driven electrically at a constant speed which is independent of the incline and the lifted load. A driven lifting platform is not described.

JP 2002 087269 discloses a drive for a hand truck in which the motor rotates freely when the hand truck is pushed forward and in which the motor is blocked when the operator pulls the hand truck in order to slow down the latter. A driven lifting operation is not described.

GB 2 362 372 describes a hand truck with a lifting platform which is hydraulically driven via a worm drive and a drive which drives the wheels in rotation as a means of propulsion of the hand truck.

SUMMARY OF THE INVENTION

It is an object of the invention to provide a hand truck for lifting loads in a driven manner, in which a load can be lifted in a simple manner while the frame is kept at an angle to the vertical by the operator, without large forces or moments being exerted on the operator.

It is also an object of the invention to provide a hand truck by means of which an operator can manoeuvre the lifted load to a load delivery position without expenditure of effort.

To this end, the hand truck according to the invention is characterized by the fact that, in a lower driving position of the lifting element, the brake is released and, when the lifting element is moved from the lower driving position to a lifting position, the brake is engaged, in which case the wheels can be driven via the motor at a positioning speed.

Due to the fact that, during driven lifting of a load along the frame of the hand truck, which load may, for example, weigh as much as 100 kg, the brake is engaged when a relatively low lifting height is reached, the hand truck no longer has the tendency to roll forwards or backwards in an uncontrolled fashion as soon as the load reaches a higher position. In the case of known hand trucks with lifting function, the latter results in the operator having to use great force to keep the truck under control.

In the bottom position of the lifting element, the wheels are either unblocked so they can be driven manually or they can be driven, for example electrically, at an adjustable speed of movement. In this case, the operator walks behind the hand truck and holds the latter at a bar or T-shaped handle near the upper side of the frame, which is at an angle to the vertical. When the operator has reached the position where the load has to be put down, he can activate the lifting drive via a part of the control device which is attached to the handle, such as a button, so that the load is lifted up. In this case, the brake is engaged, so that the rotation of the wheels is blocked, thus preventing the hand truck which is held at an angle by the operator from being propelled forwards or backwards. In a lifted position of the load, the operator can activate the motor via the handle in order to drive the wheels, which are still blocked by the brake, at a relatively slow positioning speed. As a result thereof, the lifted load can be accurately positioned using the hand truck which is driven in a controlled and braked manner, and the load can be lowered precisely in the desired position.

It is possible for the wheels to run freely in the lower driving position of the lifting element so that the hand truck is propelled by manual force. In the lifting position, the motor can be activated to brake the wheels and rotate, on command, forwards or backwards at a slow positioning speed.

It is likewise possible for the motor to drive the wheels in the driving position at a relatively fast speed of movement and for the motor to block the wheels and/or drive them in a braked manner at a slow positioning speed in the lifting position.

It is possible for the motor and the brake to be separate parts or for the motor and the brake to be a single entity with the motor also carrying out the braking function.

In one embodiment of a hand truck according to the invention, the brake device comprises the motor and at least one rotatable roller which is connected to the motor and which engages with the outer circumference of at least one wheel, which roller is attached to a pivoting arm in order to move the roller between an engagement position in which the roller bears against the outer circumference of the at least one wheel and a release position in which the roller is at a distance from the outer circumference of the wheel.

Such a roller drive can readily be installed and is commercially available as an integrated unit for driving, for example, caravans by Truma. Due to the roller drive, it is possible to achieve a relatively simple and reliable braking on the outer circumference of the wheel and the wheel can be driven at a slower positioning speed.

The roller may be connected to the bottom side of a substantially vertical pivot arm which is connected to the frame so as to be able to turn about a tilting axle which is arranged parallel to the transverse shaft, with a pulling or pushing element being connected to the pivot arm on one side and to a higher position on the frame on the other side, in which, in an equilibrium position, a longitudinal direction of the pulling or pushing element extends through the pivot pin. In a braking position, which is located on one side of the equilibrium position, of the pulling or pushing element, the pulling or pushing element produces a moment on the pivot arm which pushes the roller against the wheel and in a driving position, which is located on the other side of the equilibrium position, of the pulling or pushing element, this pulling or pushing element produces a moment on the pivot arm which pushes the roller away from the wheel.

It is readily possible to achieve two positions of the roller connected to the pivot arm by attaching a tension or compression spring, such as a gas spring, near the equilibrium position to the pivot arm, by pushing the spring to one of the sides of the equilibrium position. The lifting arm may be provided with a first ram situated above the tilting axle and a second ram situated below the tilting axle, with a guide connected to the lifting element engaging with the first ram during an upward lifting movement in order to push the pivot arm beyond its equilibrium position to the braking position, and during a downward movement engages with the second ram in order to push the pivot arm beyond its equilibrium position to the driving position.

In one embodiment of a hand truck according to the invention, the roller is driven by the motor via a worm gear, thus making braked driving possible.

A foot bracket can be provided near the bottom of the frame, so that the operator can move the frame of the hand truck from a vertical to an inclined position by placing his foot thereon.

In one embodiment, the lifting device can be displaced in the vertical direction up to a bottom lifting position, beyond the wheels. As a result thereof, when the lifting device rests on the floor, the frame, together with the wheels, the motor and the handle, can be pushed upwards, for example in order to be placed on a raised portion or in the back of a vehicle.

The lifting device can be driven, via a cylinder and a pulley and cable system, in both an upward lifting direction and a downward pushing direction. The cable system can advantageously cooperate with a double-acting cylinder which is connected to three lifting pulleys, with the top pulley being fixedly attached to the top of the frame, the bottom pulley being fixedly attached to the bottom of the frame and a central pulley being fixedly attached to the frame between the top and bottom pulley, in which a single cable runs from an attachment point on the lifting element, via a first outer lifting pulley to the central fixed pulley, to a second outer lifting pulley, via the lifting element to the bottom fixed pulley, and from there via the top fixed pulley, to the central lifting pulley to an upper attachment point. In this way, it is possible to produce both a lifting action and a pushing action on the lifting element using a single cable.

BRIEF DESCRIPTION OF THE DRAWINGS

One embodiment of a hand truck according to the invention will be explained in more detail with reference to the attached drawing, in which.

DETAILED DESCRIPTION OF THE INVENTION

Figure 1:
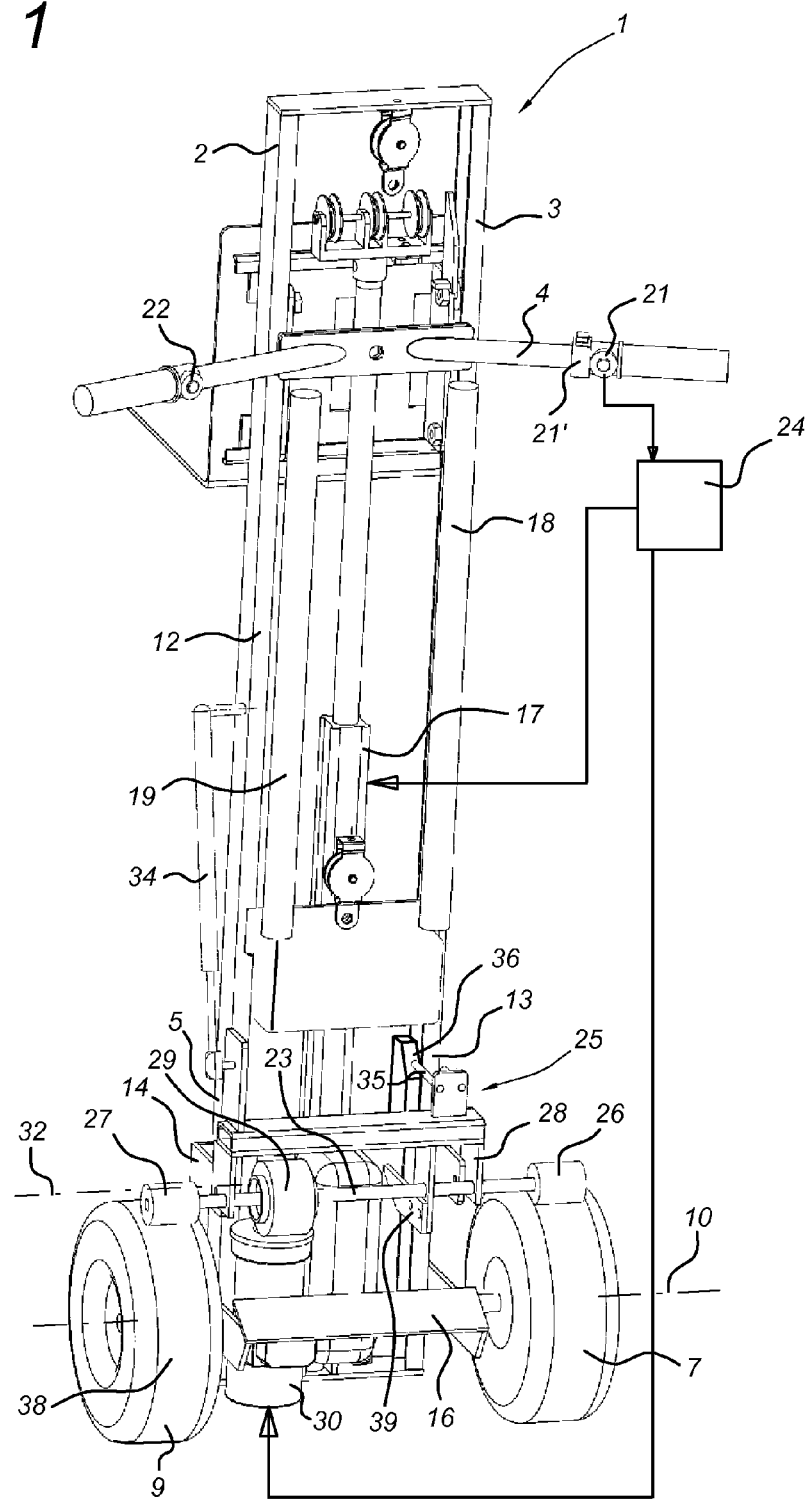
FIG. 1 shows a perspective rear view of a hand truck according to the invention.

FIG. 1 shows a hand truck 1 with a vertical frame 2. Near the upper side 3, the frame 2 is provided with a handle 4. Near the bottom side 5, the frame 2 is provided with two wheels 7,9, each of which is rotatable about a transverse shaft 10. The frame 2 has two vertical guide rails 12,13 along which a carriage 14 can move up and down via guide wheels (not shown in the figures) having a loading platform 15 attached to it. The hand truck 2 is displaceable via the wheels 7,9 and is balanced by an operator by means of the handle 4.

Figure 2:
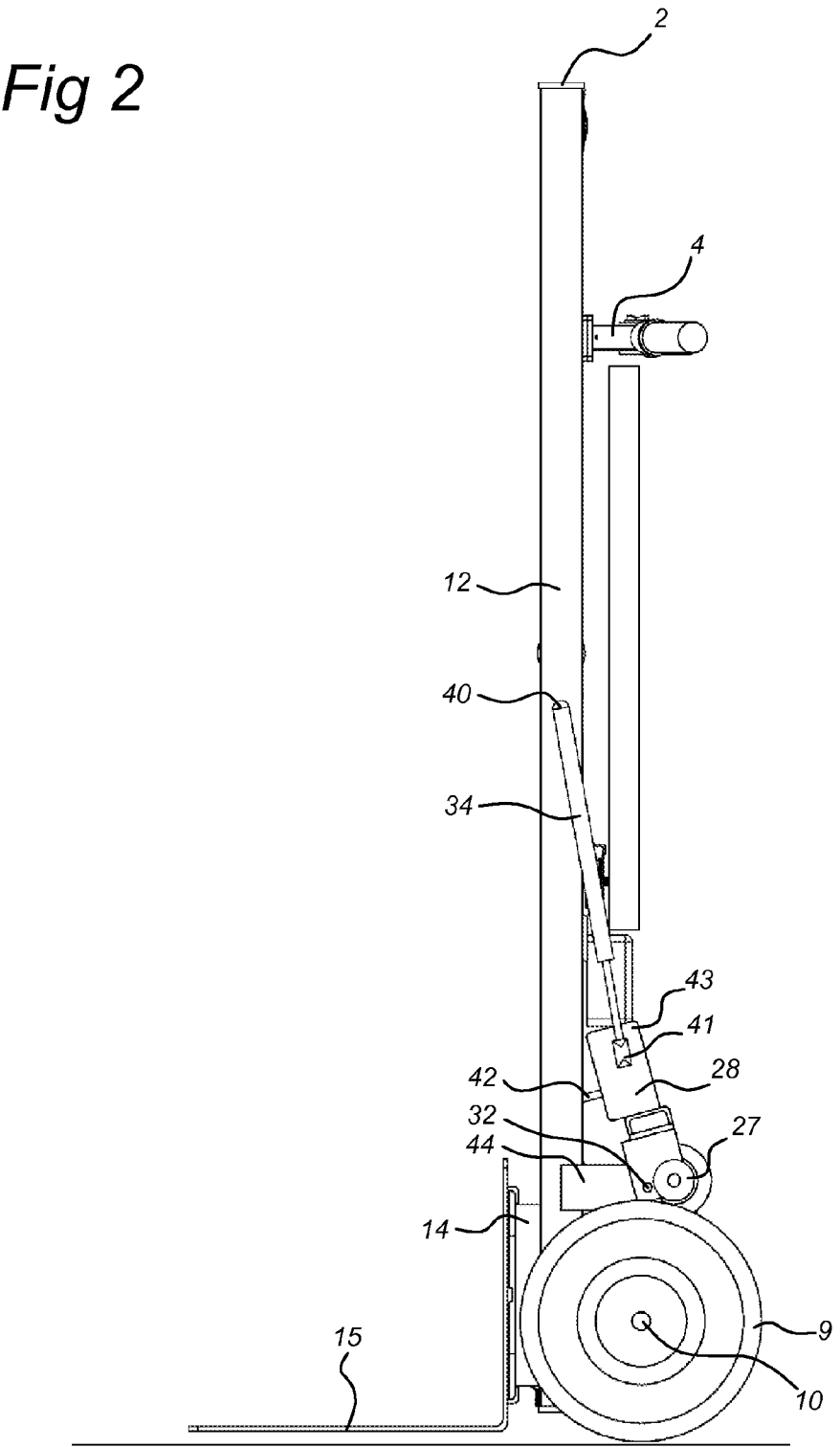
FIG. 2 shows a side view of the hand truck from FIG. 1 with the lifting element in the driving position.

In the driving position, the loading platform 15 is situated in its lowest position, as is illustrated in FIG. 2, and the wheels 7,9 can rotate freely about the shaft 10. As a result thereof, it is possible, in this position, to move a load forward at the walking speed of the operator in a manner which is also used with a customary hand truck. A foot bracket 16 situated at the rear can then be used to tilt the hand truck backwards, as a result of which the load on the hand truck 2 can be balanced and the hand truck can be driven away by the operator.

The lifting element of the hand truck, which comprises the carriage 14 and the loading platform 15, is moved upwards by means of an electrically extendable cylinder 17 via a steel cable and three-part lifting pulley 51,52,53 (see FIG. 5) in order to be able to lift loads. The electrical energy for driving the cylinder 17 is taken from batteries 18, 19. Via switches 21, 22 on the handle 4, commands for lifting or lowering the loading platform are supplied to a control unit 24 by means of which the up and down movement of the cylinder 17 is controlled.

Figure 3:
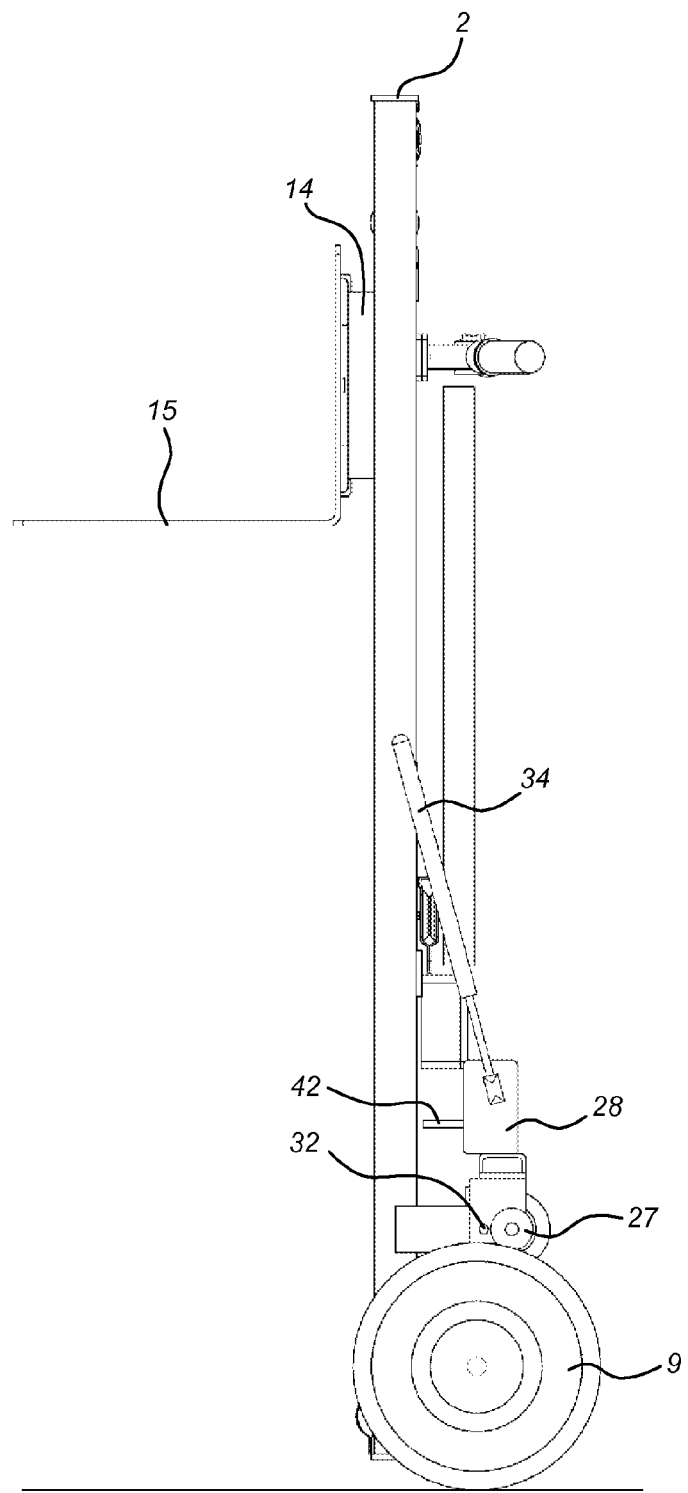
FIG. 3 shows a side view of the hand truck from FIG. 1 with the lifting element in the lifting position.

Furthermore, the hand truck 1 according to the invention comprises a brake system 25 with two rollers 26, 27 which are attached to a pivot arm 28. The rollers 26, 27 are driven by an electric motor 30 via a worm gear 29, which electric motor 30 is suspended from the pivot arm 28 together with the worm gear. The rotary speed and direction of rotation of the motor are controlled by means of the control unit 24, which receives commands from the operator via the handle 4. The pivot arm 28 is pivotable about a tilting axle 32 (see FIG. 2) which runs parallel to the transverse shaft 10 between a driving position which is illustrated in FIG. 2 and a braking position which is illustrated in FIG. 3. The pivot arm 28 is driven by a compression spring 34.

The inclination of the pivot arm 28 is activated when the carnage 14 and the loading platform 15 move upwards by a pawl 36 which is attached to the carriage 14 and which pushes a top ram 35 which is attached to the pivot arm 28 backwards. As a result thereof, the pivot arm is pivoted clockwise and the compression spring 34, due to its equilibrium situation, in which the length direction of the compression spring 34 runs through the tilting axle 32, is pushed, so that it can extend and push the rollers 27, 28 against the outer circumference 38 of the wheels 7,9, as is illustrated in FIG. 3. When the loading platform 15 moves downwards, the pawl 36 attached to the carriage 14 passes a bottom ram 39 of the pivot arm 28, so that the pivot arm 28 is turned counterclockwise and the compression spring 34, due to its equilibrium position, is brought to the driving position in which the rollers 26, 27 run clear of the outer circumference 38 of the wheels 7,9, as is illustrated in FIG. 2.

Figure 4:
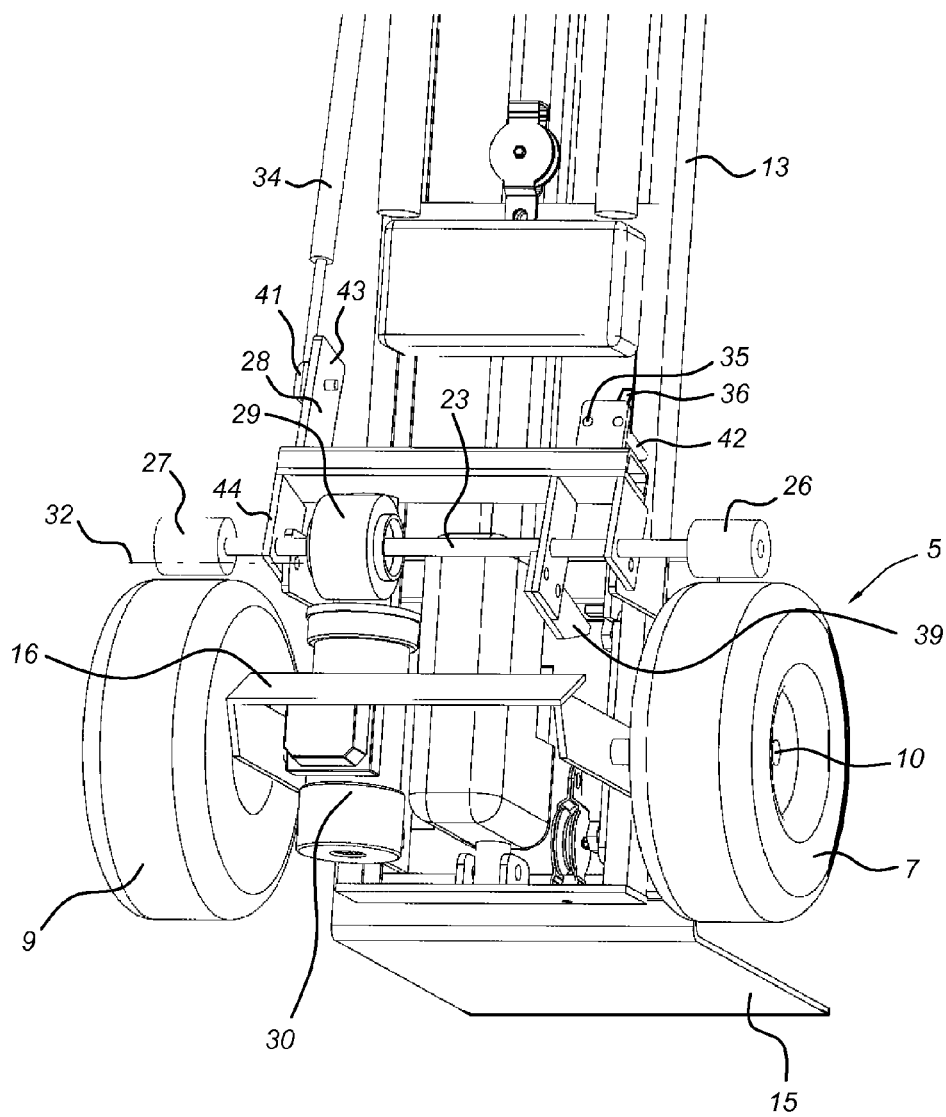
FIG. 4 shows a perspective rear view of a bottom side of the hand truck from FIG. 1.

As is illustrated in FIG. 2 and FIG. 4, the upper side 40 of the compression spring 34 is pivotably attached to the guide rails 12 of the frame, and the bottom side 41 is pivotably attached to the top end 43 of the pivot arm 28. In the driving position illustrated in FIG. 2 and FIG. 4, the compression spring 34 pushes the pivot arm 28 counterclockwise around the tilting axle 32, so that the rollers 26, 27, which are attached to the bottom end 44 of the pivot arm 28, are moved away from the outer circumference 38 of the wheels 8, 9. The position of the pivot arm 28 is limited in the driving position due to the fact that the pawl 42 strikes against guide rails 13 of the frame 2.

As soon as the loading platform 15 is lifted slightly, for example 5-10 cm, the pivot arm 28 turns clockwise about the tilting axle 32, from the driving position in FIG. 2 to the braking position in FIG. 3. The rollers 26, 27 are then pushed onto the outer circumference 38 of the wheels 7,9 by the compression spring 34. This is initiated by the oblique cam 36 (see FIG. 1) which is attached to the carriage 14 and which displaces the upper ram 35. The braking position which is illustrated in FIG. 3 remains active as long as the lifting platform 15 is in the lifting position.

The brake effect is supplied by the rollers 26, 27 which are coupled to a worm wheel drive 29 via an axle 23. This worm wheel drive cannot be driven via the side of the rollers 26,27 and the axle 28 and prevents every force coming from this side putting the worm gear in motion, while a rotation of the axle of the electric motor 30 is actually transmitted to the rollers 26, 27 by the worm gear (property of a worm gearbox). By means of the electric motor 30, the worm gear 29 can, however, be driven from the other side in order thus to achieve a controlled forward or backward movement of the hand truck in the lifting position. The electric motor 30 is driven by passing the energy in the batteries 18, 19 via the switch 21' and via the control unit or system box 24 to the electric motor 30. By reversing the polarity of the switch 21', the operator can change the driving direction from forward to backward and vice versa.

As soon as the lifting platform 15 is situated in the bottom position again, pawl 36 (see FIG. 1) ensures that bottom ram 39 is pushed down and the pivot arm 28 is turned counter-clockwise so that the brake assembly returns to the rest position counter to the force of the gas spring 34. As soon as gas spring 34 has moved through the dead point, this gas spring 34 ensures that the pivot arm 28 is securely held in the rest position. The pawl 42 limits the stroke by resting on the guide rails 13 of the main frame 2 and is adjusted such that the rollers 26, 27 are exactly clear of the wheels 7,9.

The hand truck according to the invention offers the possibility of lifting of loads, but can also, by means of the lifting platform 15, push itself up on a floor so that the frame 2 is lifted, thus aiding the operator in placing the hand truck on a higher level, for example into the loading space of a vehicle. To this end, the hand truck is designed with a double-acting electrically extendable cylinder 17, but also with a double-acting cable system. The operation thereof is shown in FIG. 5.

The lifting system 50 comprises three lifting pulleys 51, 52, 53 which are mounted in a pulley holder 65 on the piston rod 54 of the lifting cylinder 17. During lifting, the piston rod 54 extends in the upward direction and the outer lifting pulleys 51, 53 pull on the two cable portions 55, 56. A central pulley 57 is fixedly fastened to the frame 2 of the hand truck and distributes the lifting load equally between the two cable portions 55,56. These cable portions 55,56 are both attached to the assembly comprising carriage/loading platform 14, 15 by means of cable clamps 58. Via a bottom pulley 59, which is fixedly connected to the hand truck, the cable portion 60 extends in the vertical direction towards the top pulley 61. This top pulley 61 is also fixedly connected to the frame 2. The cable is conducted around the top pulley 61, with the cable portion 63 extending around the central lifting pulley 52 and returning to pulley 61. On its upper side, cable portion 63 is connected to a fastening eye 64 of the pulley 61, which is fixedly attached to the frame 2.

Figure 5:
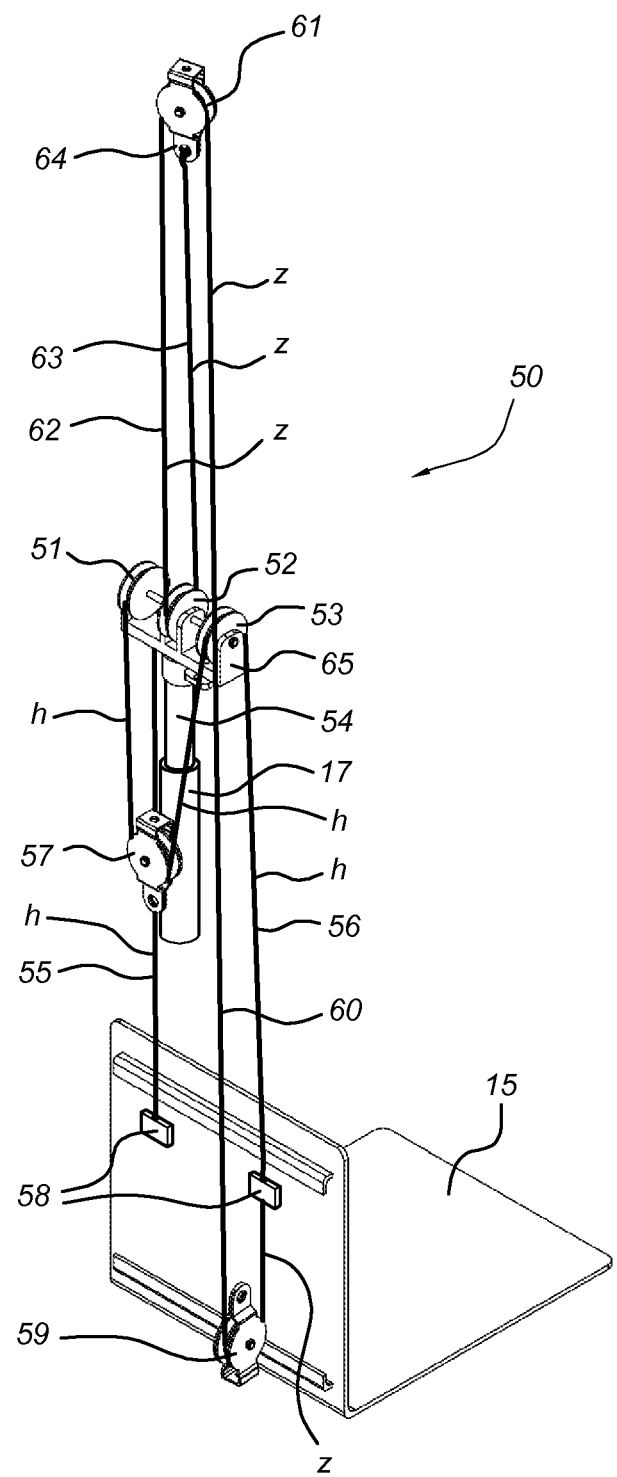
FIG. 5 shows a view of the lifting system according to the invention with a double-acting cylinder and a single cable.

The cable portions 55, 56 which are denoted by the letter h in FIG. 5 are the parts which are tensioned during lifting. The cable portions form a single cable made in one piece.

During lowering, piston rod 54 pulls on the central lifting pulley 52 of pulley holder 65 (for example by means of an electric motor). The cable portion 63 which is clamped to the eye 64 of the top pulley 61, which pulley is fixedly fastened to the upper side of the frame 2, via lifting pulley 52 and bottom pulley 59 which is attached to the bottom side of the frame 2, pulls on the assembly comprising carriage 14 and loading platform 15 in such a manner that this platform can forcefully push itself off a floor. The cable portions 60, 62 and 63 which are tensioned during lowering are denoted in FIG. 5 by the letter z. When the platform 15 pushes itself off a floor, the frame 2 is moved upwards relative to the platform 15 as a result, so that said frame (wheels, electric motor, guide rails and handle) is lifted to a higher level, and can be placed there without the operator having to lift the weight of the hand truck and only having to keep it balanced.

The invention claimed is:

1. A hand truck having a frame comprising:
   (a) a substantially vertical guide,
   (b) two wheels situated near a bottom of the guide and which are rotatable about a transverse shaft,
   (c) a handle situated near the upper side of the guide,
   (d) a lifting device comprising a lifting element displaceable along the guide,
   (e) a lifting drive connected to the lifting element for displacing the lifting element,
   (f) a motor for driving the wheels,
   (g) a brake cooperating with the wheels for blocking rotation of the wheels, and
   (h) a control device operable via the handle for switching the lifting drive and the motor on and off,
   wherein lowering the lifting element to a lower driving position releases the brake, and raising the lifting element from the lower driving position to a lifting position engages the brake so that the wheels can be driven via the motor at a positioning speed.

2. The hand truck according to claim 1, in which the motor, in the driving position of the lifting element, can drive the wheels at a speed of movement which is higher than the positioning speed.

3. The hand truck according to claim 1, in which the brake comprises the motor and at least one rotatable roller connected to the motor and which rotatable roller engages with the outer circumference of at least one wheel, which roller is attached to a pivoting arm in order to move the roller between an engagement position in which the roller bears against the outer circumference of the at least one wheel and a release position in which the roller is at a distance from the outer circumference of the at least one wheel.

4. The hand truck according to claim 3, in which the roller is connected to a bottom side of a substantially vertical pivot arm, which is connected to the frame so as to be able to turn about a tilting axle which is arranged parallel to the transverse shaft with a pulling or pushing element being connected to the pivot arm on one side and to a higher position on the frame on the other side, in which, in an equilibrium position, a longitudinal direction of the pulling or pushing element extends through the tilting axle, in a braking position, which is located on one side of the equilibrium position, of the pulling or pushing element, the pulling or pushing element producing a moment on the pivot arm which pushes the roller against the wheel and in a driving position, which is located on the other side of the equilibrium position, of the pulling or pushing element, this pulling or pushing element produces a moment on the pivot arm which pushes the roller away from the wheel.

5. The hand truck according to claim 3, in which the lifting element comprises a first ram situated above a tilting axle and a second ram situated below the tilting axle, with a guide connected to the lifting element engaging with the first ram during an upward lifting movement in order to push the pivot arm beyond its equilibrium position to the braking position, and during a downward movement engages with the second ram in order to push the pivot arm beyond its equilibrium position to the driving position.

6. The hand truck according to claim 1, in which the roller is driven by the motor via a worm gear.

7. The hand truck according to claim 1, in which the handle comprises a lifting switch and a driving switch.

8. The hand truck according to claim 1, in which a foot bracket is provided near the bottom of the frame, at a back of the hand truck.

9. The hand truck according to claim 1, in which the lifting device can be displaced in the vertical direction up to a bottom lifting position, beyond the wheels.

10. The hand truck according to claim 9, in which the lifting device is driven, via a cylinder and a pulley and cable system, in both an upward lifting direction and a downward pushing direction.

11. The hand truck according to claim 10, in which the cylinder is connected to three lifting pulleys with a top pulley being fixedly attached to a top of the frame, a bottom pulley being fixedly attached to the bottom of the frame and a central pulley being fixedly attached to the frame between the top and bottom pulleys, wherein a single cable runs from an attachment point on the lifting element, via a first outer lifting pulley to the central pulley, to a second outer lifting pulley, via the lifting element to the bottom fixed pulley, and from there via the top fixed pulley, to the central lifting pulley to an upper attachment point.

* * * * *